US010235227B2

(12) United States Patent
Purushothaman et al.

(10) Patent No.: US 10,235,227 B2
(45) Date of Patent: Mar. 19, 2019

(54) DETECTION, REMEDIATION AND INFERENCE RULE DEVELOPMENT FOR MULTI-LAYER INFORMATION TECHNOLOGY ("IT") STRUCTURES

(71) Applicant: Bank of America Corporation, Charlotte, NC (US)

(72) Inventors: Sasidhar Purushothaman, Telengana (IN); Hari Mantena, Telengana (IN); Arun Jagadeeshwaran, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 39 days.

(21) Appl. No.: 14/880,421

(22) Filed: Oct. 12, 2015

(65) Prior Publication Data

US 2017/0102997 A1 Apr. 13, 2017

(51) Int. Cl.
*G06F 11/00* (2006.01)
*G06F 11/07* (2006.01)

(52) U.S. Cl.
CPC ........ *G06F 11/0706* (2013.01); *G06F 11/079* (2013.01); *G06F 11/0784* (2013.01); *G06F 11/0793* (2013.01)

(58) Field of Classification Search
CPC .... G06F 11/1415; G06F 11/006; G06F 11/07; G06F 11/0703; G06F 11/0709; G06F 11/0712; G06F 11/0715; G06F 11/0727; G06F 11/0751; G06F 11/0754; G06F 11/076; G06F 11/0766; G06F 11/0769; G06F 11/0772; G06F 11/0775; G06F 11/0781; G06F 11/079; G06F 11/0793; G06F 11/30; G06F 11/3003; G06F 11/3006; G06F 11/301; G06F 11/3013; G06F 11/3017; G06F 11/302; G06F 11/3051;
(Continued)

(56) References Cited

U.S. PATENT DOCUMENTS 5,568,491 A 10/1996 Beal et al.
6,237,114 B1 5/2001 Wookey et al.
(Continued)

*Primary Examiner* — Anthony J Amoroso
(74) *Attorney, Agent, or Firm* — Weiss & Arons LLP; Michael A. Springs, Esq.

(57) ABSTRACT

An apparatus for detection, remediation and inference rule development for multi-layer information technology IT structures is provided. Certain embodiments of the apparatus may include an event generator. The event generator may monitor for, retrieve, and pool error events and performance events from alerting sources. The alerting sources may provide event information from one more of multiple layers. The apparatus may also include an event parser that provides a system status. The apparatus may include an analytics engine that detects patterns and relationships in the retrieved error events, performance events and system status, and models event hierarchies based on the detected patterns and relationships. The analytics engine may invoke auto-remediation processes in response to pre-determined error events. In some embodiments, the engine may detect a pre-determined number of resource-related events. Based on the detecting, the analytics engine may attribute the resource-related events to infrastructure resources.

23 Claims, 10 Drawing Sheets

(58) Field of Classification Search
CPC .. G06F 11/3055; G06F 11/3096; G06F 11/34; G06F 2201/805; G06F 2201/85
See application file for complete search history.

(56) References Cited

U.S. PATENT DOCUMENTS

| | | | | |
|---|---|---|---|---|
| 6,898,733 | B2 * | 5/2005 | Parks | G06F 11/0715 714/15 |
| 8,082,471 | B2 * | 12/2011 | Khan | G06F 11/3608 714/38.1 |
| 8,205,122 | B1 * | 6/2012 | Leverich | G06F 11/3409 714/47.1 |
| 9,053,216 | B1 | 6/2015 | Coleman et al. | |
| 9,875,122 | B2 * | 1/2018 | Dahlstedt | G06F 9/45533 |
| 2004/0153844 | A1 * | 8/2004 | Ghose | H04L 41/064 714/42 |
| 2008/0148110 | A1 * | 6/2008 | Bhamidipaty | G06F 11/079 714/57 |
| 2009/0182794 | A1 | 7/2009 | Sekiguchi | |
| 2010/0164715 | A1 | 7/2010 | Buller et al. | |
| 2010/0174812 | A1 * | 7/2010 | Thomas | G06F 21/305 709/224 |
| 2012/0110153 | A1 | 5/2012 | Atkins et al. | |
| 2012/0144020 | A1 | 6/2012 | Carey et al. | |
| 2012/0204068 | A1 | 8/2012 | Ye et al. | |
| 2012/0304012 | A1 | 11/2012 | Atkins et al. | |
| 2013/0097620 | A1 | 4/2013 | Carey et al. | |
| 2013/0132149 | A1 | 5/2013 | Wei et al. | |
| 2014/0019814 | A1 * | 1/2014 | McNairy | G06F 11/2215 714/49 |
| 2014/0040673 | A1 | 2/2014 | Carey et al. | |
| 2014/0047273 | A1 | 2/2014 | Carey et al. | |
| 2014/0068343 | A1 | 3/2014 | Nakajima et al. | |
| 2015/0033243 | A1 | 1/2015 | Carey et al. | |
| 2015/0121136 | A1 * | 4/2015 | Namkoong | G06F 11/0793 714/15 |
| 2015/0193296 | A1 | 7/2015 | Chen et al. | |
| 2015/0195165 | A1 | 7/2015 | Boger | |
| 2015/0355976 | A1 | 12/2015 | Carey et al. | |
| 2016/0004582 | A1 | 1/2016 | Nagura et al. | |

* cited by examiner

| A | 802 B | C | D | E | F |
|---|---|---|---|---|---|
| Incident Numb | SUMMARY | Title | Submit Date | Ticket Status | Assign in Str Date |
| XXXX IMXXXXXX | EnterpXXXXXXXXXXXX system Warning system may have been rebooted TSSM - Server - Critical - mon1302xgbrU1 | Reboot | | CLOSED | |
| XXXX IMXXXXXX | & multiple servers - Service is Paused | Service | | CLOSED | |
| XXXX IMXXXXXX | Server - - Critical - XXXXXXXXXXXXXX - Txxxxxxxxxxxxxxxxxxxxxxxxxxxxxxxxxx - Server - Red - | Grew | | CLOSED | |
| XXXX IMXXXXXX | xxxxxxxxxxxxxxxxxxx- Disk C is 95 percent full space available = | Disk Alert | | CLOSED | |
| XXXX IMXXXXXX | 2XXXXXXXXXXXXXXXXXXXXXXXXXXXXXXXXXXConnectivity XXXXXXXXXXXXXXXXXXXXXXXX BACKUP | MIC | | CLOSED | |
| XXXX IMXXXXXX | FAILURE XXXXXXXXXXXX | Grew | | CLOSED | |
| XXXX IMXXXXXX | TSSM - Minor - XXXXXXXXXXXX- system Warning system may have been rebooted sysuptime TSSM - Server - | Reboot | | CLOSED | |
| XXXX IMXXXXXX | Minor -XXXXXXXXXXXXXXXX system Warning system may have been rebooted | Reboot | | CLOSED | |
| XXXX IMXXXXXX | EXXXXXXXXXXXXXXXXXXXXXXXXXXXX Agent Offline | ITM OFF | | CLOSED | |
| XXXX IMXXXXXX | TSSM - Server - Red - XXXXXXXXXXXXXXXXXXXXXXX - Disk C is 100 percent full space available = 1 Enterprise/ | Disk Alert | | CLOSED | |
| XXXX IMXXXXXX | MXXXXXXXXXXXXXXXXXXXXXXXXXXXXXXXXXXXXXXXXXXXXXXXXXXXXXXe | Storage | | CLOSED | |
| XXXX IMXXXXXX | EXXXXXXXXXXXXXXXXXXXXXXXXXXXXXXXXXXXXXXXXXXXXXXXXXXXXXXXXXXXXe | Storage | | CLOSED | |
| XXXX IMXXXXXX | TSSM - Server - Red -XXXXXXXXXXXXXXXXXXXXXXXXXXXXXXXXXXXXXXXXXXXXXXXXX.com is not reachable | ICMP | | CLOSED | |
| XXXX IMXXXXXX | server-XXXXXXXXXXXXXXXXXXXXXXXXXXXXXXXXXXXXXXXXXXXXX.com is not reachable | ICMP | | CLOSED | |
| XXXX IMXXXXXX | TSSM - XXXXXXXXXXXXXXXXXXXXXXXXXXXXXXXXXXXXX - system Warning system may have been rebooted | Reboot | | CLOSED | |
| XXXX IMXXXXXX | sysuptime XXXXXXXXXXXXXXXXXXXXXXXXXXXXXXXXXXXXXXXXXXXXXXXXXXXXXXXXXXXXXXXXXXXXXXWarning | ITM OFF | | CLOSED | |
| XXXX IMXXXXXX | system may have been rebooted TSSM - Major -XXXXXXXXXXXXXXXXXXXXXXXXXXXXXX free out of a total of | Reboot | | CLOSED | |
| XXXX IMXXXXXX | 35860MB | Disk Alert | | CLOSED | |
| XXXX IMXXXXXX | TSSM - Server - Red - XXXXXXXXXXXXXXXXXXXXXXXXXXXXXXXXXXXXXXXXXXXXXXXX.com is not reachable TSSM | ICMP | | CLOSED | |
| XXXX IMXXXXXX | XXXXXXXXXXXXXXXXXXXXXXXXXXXXXXXXXXXXXXXXXXXXXXXXXXXXXX system Warnin TSSM | Grew | | CLOSED | |
| XXXX IMXXXXXX | XXXXXXXXXXXXXXXXXXXXXXXXXXXXXXXXXX is offline no monitoring on this node | ICMP | | CLOSED | |
| XXXX IMXXXXXX | XXXXXXXXXXinaccessible | Grew | | CLOSED | |
| XXXX IMXXXXXX | TSSM - Critical XXXXXXXXXXXXXXXXXXX com is not reachable (Network********x) | ICMP | | CLOSED | |
| XXXX IMXXXXXX | TSSM - Server - Red - uernelmillevrrus - Disk X is 95 percent full space available = XXXXXXXXXXXXXXXX | Disk Alert | | CLOSED | |
| XXXX IMXXXXXX | TSSM - Critical - XXXXXXXXXXXXXXXXXXXXXXXXXXXXXX.com is not reachable (net TSSM - Server - Red - | ICMP | | CLOSED | |
| XXXX IMXXXXXX | XXXXXXXXXXXXXXXXXXXXXXXXXXXXXXXXXXXXXXXXXXXXXXXXXXXXXXXs offline no monitoring Enterprise/ | ITM OFF | | CLOSED | |
| XXXX IMXXXXXX | MXXXXXXXXXXXXXXXXXXXXXXXXXXXXXXXXXXXXXX system Warning system may have been rebooted | Reboot | | CLOSED | |
| XXXX IMXXXXXX | Enterprise/MinoXXXXXXXXXXXXXXXXXXXXXXXXXXXXXXXXXXsystem Warning system may have been rebooted | Reboot | | CLOSED | |
| XXXX IMXXXXXX | TSSM - Minor - XXXXXXXXXXXXXXXXX system Warning system may have been rebooted sysuptime | Reboot | | CLOSED | |
| XXXX IMXXXXXX | [MLFC]XXXXXXXXXXXXXXXXXXXXXXXXXXXXXXXXXXXXX Redundancy Reduced Trap TSSM - Minor - | MIC | | CLOSED | |
| XXXX IMXXXXXX | XXXXXXXXXXXXXXXXXXXX - system Warning system may have been rebooted sysuptime | Reboot | | CLOSED | |

| | | |
|---|---|---|
| 6 | BACKUP Alert | 2616 |
| 7 | test | 2163 |
| 8 | Reboot | 1975 |
| 9 | ICMP | 1550 |
| 10 | Disk Alert | 875 |
| 11 | Hardware | 787 |
| 12 | Service | 471 |
| 13 | Cluster | 388 |
| 14 | General | 311 |
| 15 | ITM OFFLINE | 306 |
| 16 | Netbackup | 265 |
| 17 | Storage | 257 |
| 18 | Network | 197 |
| 19 | Memory | 157 |
| 20 | VirtualCenter host | 100 |
| 21 | CPU | 76 |
| 22 | Scan32 | 27 |
| 23 | Unexpected | 15 |
| 24 | Restore | 2 |
| 25 | (blank) | |
| 26 | Grand Total | 12538 |

FIG. 8B

DETECTION, REMEDIATION AND INFERENCE RULE DEVELOPMENT FOR MULTI-LAYER INFORMATION TECHNOLOGY ("IT") STRUCTURES

CROSS-REFERENCE TO RELATED APPLICATION

Co-pending Commonly-Assigned application Ser. No. 14/880,349 entitled "Event Correlation and Calculation Engine", and Ser. No. 14/880,374, entitled "Method and Apparatus for a Self-Adjusting Calibrator", filed on even date herewith, are hereby incorporated by reference herein in their respective entireties.

FIELD OF TECHNOLOGY

Aspects of the invention relate to maintaining information technology ("IT") structures.

BACKGROUND

Many times in computer system architectures, applications may reside on different layers of an IT structure. These layers may include a network layer, a bare metal layer, a virtual layer, an operating system layer, a middle ware ("MW") layer, a data layer and any other suitable layers. If an event or issue occurs, it may be difficult to detect and/or locate the problem. The layered architecture may add to the complexity of the detection and location of the problem.

In addition, unrelated teams of IT professionals may operate on different layers of an IT structure. Sub-optimal communication between the teams may also add to the complexity of detecting and remediating a problem in the system architecture.

Absence of meaningful interpretation of applications' performance and the infrastructure state is a cause for alarm among applications operators and/or interested parties (collectively, "stakeholders"). To achieve real-time insight on the environment stability from monitored parameters, there exists a need to analyze mass events, correlate, pinpoint significant events and infer future events that may draw the attention of stakeholders. Furthermore, there exists a need to proactively highlight issues before the same issues grow in scope and/or gravity.

It would be desirable to quickly and efficiently locate, among various levels of an IT structure, detect, and preferably remediate at the source, the problem before end users become frustrated.

It would also be desirable to be able to infer where, among a multi-layer IT structure, and when a future problem is likely to occur.

SUMMARY OF THE DISCLOSURE

Certain algorithms according to the invention dynamically predict and identify ensuing problem events based on correlation ability at various layers. Furthermore, certain embodiments preferably learn, in response to receiving information regarding event occurrences, and then map or correlate historical failures to newly-received event occurrences. In addition, some embodiments may synchronize real-time remediation based on patterns of historical failures.

It is an object of this invention to provide systems and methods for detection, remediation and inference rule development for multi-layer information technology ("IT") structures. A method for detection, remediation and inference rule development for multi-layer information technology ("IT") structures is provided. The layers in the multi-layer IT structure may include one or more of a network layer, a bare metal layer, a virtual layer, an operating system layer, a middle ware ("MW") layer and a data layer. The method may include monitoring, retrieving, and pooling error events and performance events from a collection of alerting sources. The alerting sources may provide event information from the network layer, the bare metal layer, the virtual layer, the operating system layer, the MW layer and the data layer. The method may further include parsing the error events and performance events to provide a current system status as well as detecting patterns and relationships in the retrieved error events, performance events and system status. The method may also include modeling event hierarchies based on the detected patterns and relationships and invoking at least one auto-remediation process in response to pre-determined error events. The auto-remediation process may be based, at least in part on the detected patterns, relationships and hierarchies.

In certain embodiments, the auto-remediation process may detect a pre-determined number of occurrences of "string not found" over a pre-determined period and also detect an outage following every occurrence of "string not found" over the pre-determined time period. Based on the foregoing, some embodiments may infer a rule for the occurrence of the outage following the occurrence of "string not found."

BRIEF DESCRIPTION OF THE DRAWINGS

The objects and advantages of the current invention will be apparent upon consideration of the following detailed description, taken in conjunction with the accompanying drawings, in which like reference characters refer to like parts throughout, and in which:

FIG. 8A and FIG. 8B show a log according to certain embodiments; and

DETAILED DESCRIPTION OF THE DISCLOSURE

Figure 1:
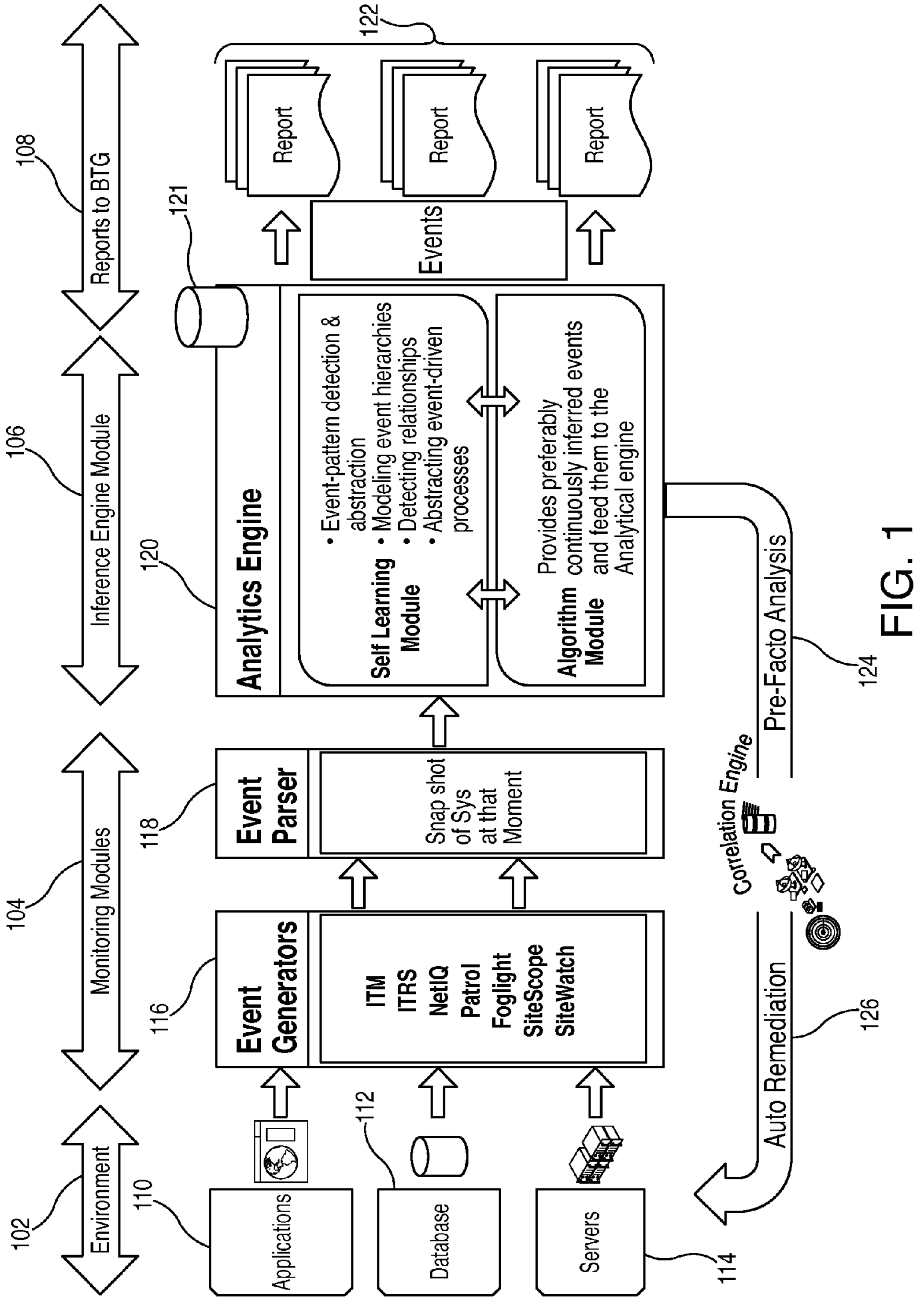
FIG. 1 shows an architecture for use according to the principles of certain embodiments.

Systems and methods for providing an apparatus for detection, remediation and inference rule development for multi-layer information technology ("IT") structures is provided. The layers in the multi-layer IT structure may include one or more of a network layer, a bare metal layer, a virtual layer, an operating system layer, a middle ware ("MW") layer and a data layer.

The apparatus may include an event generator. The event generator may monitor for, retrieve, and pool a plurality of error events and a plurality of performance events from a collection of alerting sources. The alerting sources may provide event information from at least one of the network layer, the bare metal layer, the virtual layer, the operating system layer, the MW layer and the data layer.

The apparatus may also include an event parser that provides a system status. The system status may preferably be a technological snapshot of the system at a particular point in time.

The apparatus may also include an analytics engine. The engine may detect a plurality of patterns and a plurality of relationships in the retrieved error events, performance events and system status, and model event hierarchies based on the detected patterns and relationships.

In certain embodiments of the invention, self-healing correlation, for correlating a detected event with a possible remediation, may be enforced by monitoring a system's execution pattern with respect to certain preferably customizable set point definitions. Such correlation may preferably dynamically evaluate the environment for degree of fulfilling the context policies in the current context situation. Thereafter, the remediation may be selected based on the correlation.

In such embodiments, the analytics engine, or, more particularly, the analytics engine which may be a module within an inference module, may become context-aware—i.e., aware of information about preferably each alert—prior to invoking the functions and routines necessary to adapt the remediation. The following table reflects an exemplary summary of alerts in accordance with certain embodiments.

| Summary of the Alert | Parameters (Metric Values of Parameters) | | | | | Duration of Issue | Type of Fix | Remediation Dependency | Recovery Time | Resolution Complexity | Automation Possibility |
|---|---|---|---|---|---|---|---|---|---|---|---|
| Alert Name/ Type | CP 1 | CP 2 | CP 3 | CP 4 | CP 5 | Transient | Config. Chg. | System Admin. | Instantaneous | Routine | Easily Automated |

The analytics engine may be configured to invoke one or more auto-remediation processes in response to pre-determined error events. The one or more auto-remediation processes may be based, at least in part, on the detected patterns, relationships and hierarchies. The engine may also detect a threshold number of occurrences relating to a sequence of a pre-determined number of memory errors over a pre-determined period of time. The analytics engine may invoke at least one auto-remediation process in response to the detection of the pre-determined number of memory errors over a pre-determined period of time. The auto-remediation process may include at least one of restart, bounce service, kill present application and exit current routine.

It should be noted that static threshold detection may be utilized for detecting when monitored event parameters surpass thresholds according to certain embodiments. Event detections, or groups of event detections, may be reported when the monitored event parameter exceeds a predetermined threshold value. The detection condition may be considered to persist as long as the parameter value exceeds the threshold set point.

Alternatively to static detection methods, probabilistic event detection methods may also be used. Such probabilistic event detection methods may include methods in which a probability of event occurrence and other related probabilities and parameters are computed and assessed rather than computing and testing statistics from a sample data set. For example, the time-varying Poisson model may provide a robust and accurate framework for determining probability of event occurrence and other related probabilities and parameters.

Machine-learning methods may also be used in event detection and may be both computationally and informationally intensive. Composite methods are yet another alternative to static detection methods. These methods may combine techniques within a category or from two or of the categories. Bayesian Gaussian Process ("BGP") models, for example, combine probabilistic and machine-learning methods of event detection.

To the extent that the table reflects various aspects of the events, the correlation possibilities can be planned thereupon. The metric values for each parameter may be weighted to reflect the relative importance attributable to different aspects of the alerts. The duration of the alert, recovery time, resolution complexity, and automation possibility are relatively self-explanatory. The type of fix may relate to the type of action required for remediation.

The analytics engine may further invoke at least one auto-remediation process in response to the detection of a pre-determined down time associated with data-source-name ("DSN")-related errors. Down time may be calculated as a percentage of a pre-determined period of time.

The engine may also be configured to detect a pre-determined number of resource-related events over a pre-determined amount of time. Based on the pre-determined number of resource-related events over a pre-determined amount of time, the analytics engine may be configured to attribute the resource-related events to infrastructure resources.

The engine may also be configured to detect a pre-determined number of occurrences of a "string not found" error event over a pre-determined period. The engine may further detect an outage following every occurrence of "string not found" error event over the pre-determined time period. The analytics engine may also be configured to infer a rule for the occurrence of the outage following the occurrence of "string not found."

The engine may also be configured to detect a pre-determined number of occurrences of "application round-trip time-out(s)" event alerts over a pre-determined period. The pre-determined number of occurrences of "application round-trip time-out" event alerts may correspond to a greater than threshold level of application slowness. The greater than threshold level of application slowness may, in certain circumstances, inhibit, restrict, or even terminate, a communication channel between the apparatus and a pre-determined application.

As mentioned above, certain embodiments may include methods that detect a pre-determined number of occurrences of "string not found" over a pre-determined period and also detect an outage or failure following every occurrence of "string not found" over the pre-determined time period. The methods may further include which infers a rule for the occurrence of the outage following the occurrence of "string not found."

An inference module, according to certain embodiments, may be purposed for capturing legacy troubleshooting techniques and knowledge on how to act and respond, in view of the received alerts and system status. Furthermore, the inference module may use a continuously growing base of knowledge to form, execute and/or indicate resolution options for remediation.

In certain embodiments, the module may then embed these options as part of an incident life cycle routine which preferably continuously sources a feedback mechanism. Such a feedback mechanism preferably grows a database of failure types and remediation methods.

It should be noted that all the methods in this application may be combined with each other, to the extent that is suitable, such that any portion of the specification may be combined with any other portion of the specification.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention described herein may take the form of an entirely hardware embodiment, an entirely software embodiment or an embodiment combining software, hardware and any other suitable approach or apparatus.

Furthermore, aspects of the invention may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an architecture for use according to the principles of certain embodiments. The architecture includes four components: environment 102, monitoring modules 104, inference engine module 106 and reporting module 108.

Environment 102 may preferably include applications 110, database(s) 112 and/or servers 114. Each of applications 110, database(s) 112 and/or servers 114 are preferably in communication with one or more of event generators 116.

Event generators 116 may preferably include monitoring components for monitoring error events. Such monitoring components may include IBM Tivoli Monitoring ("ITM"), ITRS (a monitor for detecting application-level errors that can correlate historical failures with one another as well as correlating historical failures with present failures), NetIQ (which provides exclusive monitoring for operating system (s) and preferably monitors a broader scope than ITRS), Patrol (which provides UNIX monitoring), Foglight (which provides database monitoring), SiteScope (which provides application monitoring and penetrates up to 4 or 5 levels of the architecture to ascertain the nature of a detected error event) and SiteWatch (which also provides application monitoring and may dynamically penetrate multiple layers in response to an error event, based on conditions surrounding the error event.)

The event generators 116 may preferably communicate the events to an event parser 118. Event parser 118 may correlate historical and/or substantially current events to form an assessment of the current system condition. In certain embodiments, event parser 118 may consider only patterns of events independent of the layer in which the events were generated. In other embodiments, event parser 118 may preferably consider patterns of event taken in the context of the layer in which the events were generated.

Taken together, event generators 116 and event parser 118 may be considered as monitoring modules 104.

Inference engine module 106 may include analytics engine 120. Analytics engine 120 may preferably include a self-learning module and/or an algorithm module.

The self-learning module may preferably provide event-pattern detection and abstraction. The self-learning module may also model event hierarchies. The self-learning module may also detect relationships between various events as well as abstract event-driven processes.

The algorithm module may preferably continuously produce the inferred events and feed them into analytics engine 120, and/or the self-learning module, particularly.

Following treatment of the events—i.e., analysis and/or inference of future events—by analytics engine 120, the treated events 121, as well as treatment by analytics engine may preferably be sent as reports 122 to the Business Technology Group ("BTG") 108.

It should be noted that analytics engine 120 may preferably provide a pre-facto analysis and/or auto-remediation 126 solution, where appropriate, to applications 110, database 112 and/or servers 114.

Figure 2:
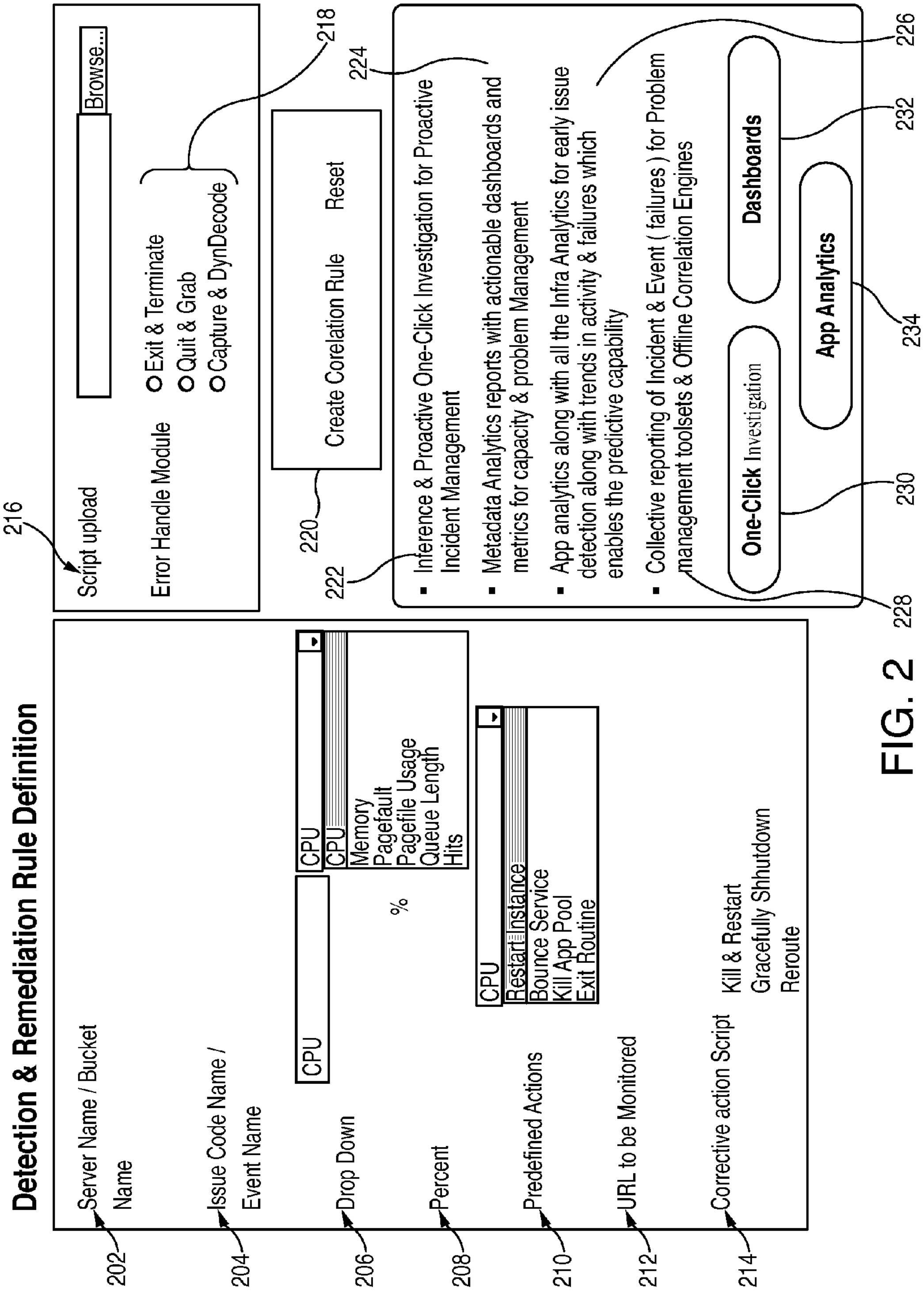
FIG. 2 shows a graphical user interface ("GUI") for use according to the principles of certain embodiments.

FIG. 2 shows a graphical user interface ("GUI") for use according to the principles of certain embodiments. The GUI in FIG. 2 may preferably be directed to event detection and remediation rule definition. Such definition may preferably be used to guide a system with respect to responding to a pre-determined set of events.

The GUI in FIG. 2 may include a server name field 202, an issue code name/event field 204, a drop-down field 206 for determining to which of the central processing unit ("CPU"), memory, pagefault, pafefile usage, queue length and/or hits, the event pertained. Field 208 may show a percent operation of the selected member of the group of the drop-down field. Field 210 may preferably show predefined actions to take regarding the event. For example, when a CPU begins functioning at over ninety percent, or some other suitable percentage, capacity, this condition may trigger an event. Alternatively, when a memory is functioning at over ninety-five percent, or some other suitable percentage, this memory condition may trigger an event. Pre-defined actions, taken in response to an event, may include implementation of a restart instance, a bounce service, a kill application pool and an exit routine. It should be noted that when a predefined condition of given parameters and/or situations (as defined by pre-determined thresholds) is met, certain embodiments can either have one of the defined action performed or execute a custom script in order to take action relevant to the situation. In some embodiments, the custom script may be input by the user.

Field 212 may include a URL to be monitored. Such a field may preferably determine a response time for the URL. Such a determination may preferably be used narrow the understanding of the scope of the error event.

Field 214 may include a corrective action script, including, but not limited to Kill & Restart, Gracefully Shutdown and Reroute. Field 216 may provide a script upload field for browsing for a script that may be used to remediate an event. Error handle module may include exit & terminate, quit & grab and/or capture & dyndecode 218. In certain embodiments, the health and stability of the infrastructure performance and process execution may be sensed based on the key modules within the OS layer and the app. layer. Such embodiments may preferably maintain a list of error codes and any occurrence of a particular error code may invoke a relevant module to take retrieve a current status of the system as well as invoke one or more corrective actions to remediate any errors associated with the occurrence of the maintained code.

Once the appropriate fields have been completed and/or an appropriate script has been uploaded, the system may provide a create correlation rule field 220. Create correlation rule field 220 may preferably enable a user to use the information entered into the appropriate fields have been completed and/or the appropriate script, as well as the event that was detected, and, based some or all the foregoing information, create a rule that may be used for future events.

Additional features that may be included in the detection and remediation rule definition screen may include inference and proactive one-click investigation for proactive incident management 222, which may be activated by selectable button 230, metadata analytics reports with interactive dashboards and metrics for capacity and event/problem management 224, which may be activated by selectable button 232, and application analytics along with all the infra-analytics—i.e., analytics used for inferring future events—for early event issue detection along with trends in activity and failures which enable the predictive capability 226, and which may be activated by selectable button 234. One additional feature may include collective reporting of incident and error events and/or failures for problem management toolsets and offline correlation engines.

Figure 3:
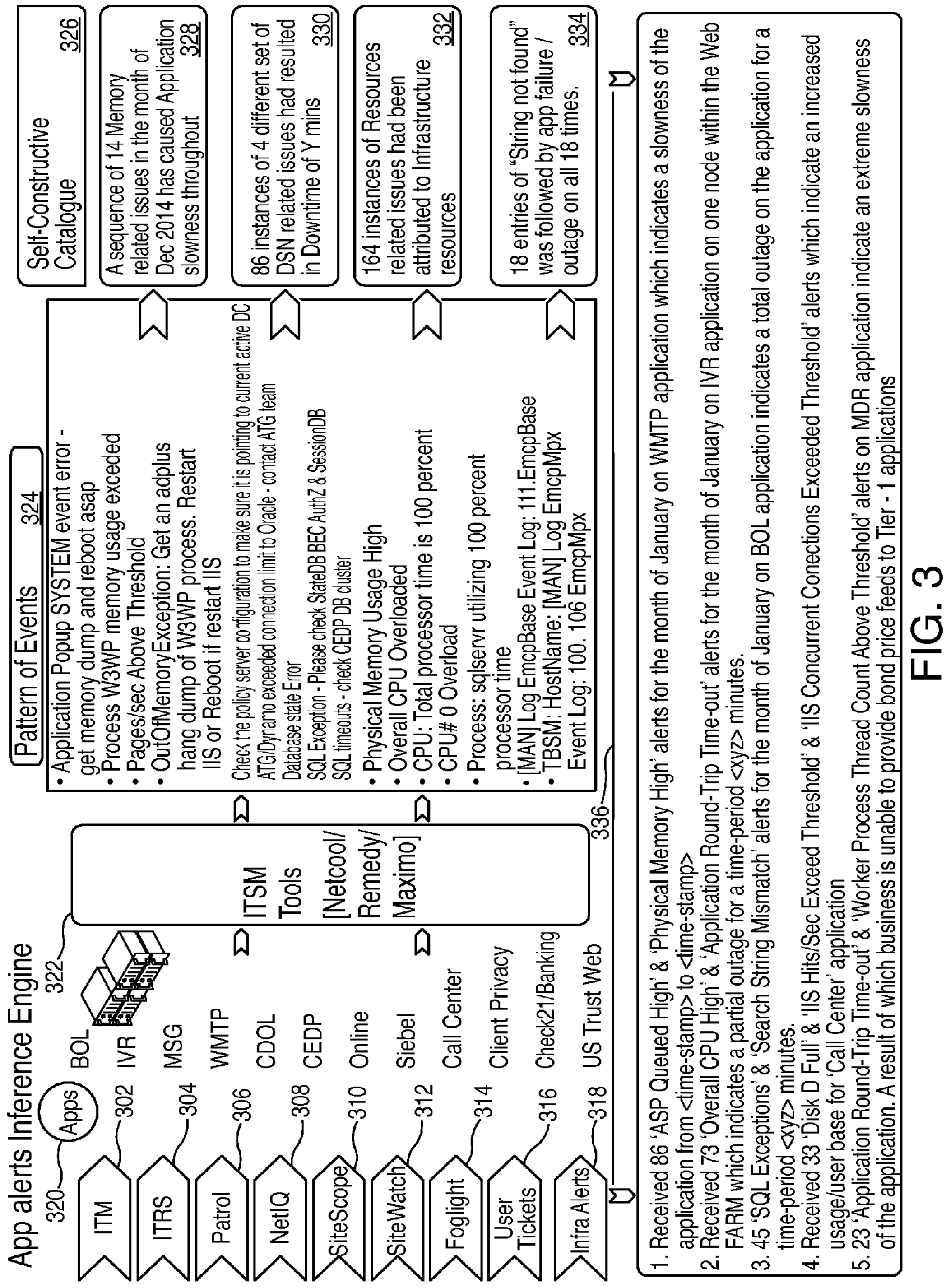
FIG. 3 shows an application alerts inference engine according to certain embodiments.

FIG. 3 shows an application alerts inference engine according to certain embodiments. This engine preferably inventories the performance of the system and uses a self-constructive catalogue to report errors.

The engine in FIG. 3 may relate to the middle ware ("MW") layer perspective. FIG. 3 may preferably show an MW work flow. The application alerts inference engine may preferably include inputs such as ITM 302, ITRS 304, Patrol 306, NetIQ 308, SiteScope 310, SiteWatch 312, Foglight 314, User Tickets 316, and Infra Alerts 318.

The applications 320 which may be monitored include the following—BOL, IVR, MSG, WMTP, CDOL, DEDP, Online, Siebel, Call Center, Client Privacy, Check 21/Banking and/or US Trust Web.

ITSM Tools 322 (which may include tools such as Netcool/Remedy and/or Maximo) may be used to forward and develop the collection of various events such that pattern(s) of events 324 are developed. As shown in FIG. 3, exemplary patterns of events may include the following (it should be noted that the following events have been maintained in their original syntax in order to maintain the accuracy of the event descriptions. It should be noted as well that the descriptions are, for the most part, well known to those skilled in the art when not referring to specific assignee call-outs):

Application Popup SYSTEM event error—get memory dump and reboot asap
Process W3WP memory usage exceeded
Pages/sec Above Threshold
OutOfMemoryException: Get an adplus hang dump of W3WP process. Restart IIS or Reboot if restart IIS
Check the policy server configuration to make sure it is pointing to current active DC
ATG/Dynamo exceeded connection limit to Oracle—contact ATG team
Database state Error
SQL Exception—Please check StateDB BEC AuthZ & SessionDB SQL timeouts—check CEDP DB cluster
Physical Memory Usage High
Overall CPU Overloaded
CPU: Total processor time is 100 percent
CPU#0 Overloaded
Process: sqlservr utilizing 100 percent processor time
[MAN] Log EmcpBase Event Log: 111.EmcpBase
TBSM: HostName: [MAN] Log EmcpMpx Event Log: 100. 106 EmcpMpx Self-constructive catalogue 326 may include an indexing of the various events set forth, inter alia, in the patterns of events 324. Catalogue 326 also includes many other events as well.

The indexing may return the following entries: a first pattern may correspond, in laymen's language, to a sequence of 14 memory-related issues in the month of December 2014 that has caused application slowness throughout, as shown in step 328. A second pattern may correspond to 86 instances of four different sets of DSN-related issues that had resulted in downtime of Y minutes, as shown in step 330. A third pattern may correspond to 164 instances of resource-related issues that had been attributed to infrastructure resources, as shown in step 332. A fourth pattern may correspond to 18 entries of "String not found" that were followed by application failure/outage on all 18 times, as shown in step 334.

In addition to the events shown in self-constructive catalogue 326, there may be a variety of inferences, as shown in inference table 336. These inferences may include "received 86 'ASP Queued High' & 'Physical Memory High' alerts for the month of January on WMTP application which indicates a slowness of the application from <time-stamp> to <time-stamp>", "received 73 'Overall CPU High' & 'Application Round-Trip Time-out' alerts for the month of January on IVR application on one node within the Web FARM which indicates a partial outage for a time-period <xyz> minutes", "45 'SQL Exceptions' & 'Search String Mismatch' alerts for the month of January on BOL application indicates a total outage on the application for a time-period <xyz> minutes", "Received 13 'Disk D Full' & 'HS Hits/Sec Exceed Threshold' & 'HS Concurrent Connections Exceeded Threshold' alerts which indicate an increased usage/user base for 'Call Center' application", and "23 'Application Round-Trip Time-out' & 'Worker Process Thread Count Above Threshold' alerts on MDR application indicate an extreme slowness of the application. A result of which business is unable to provide bond price feeds to Tier-1 applications."

Figure 4:
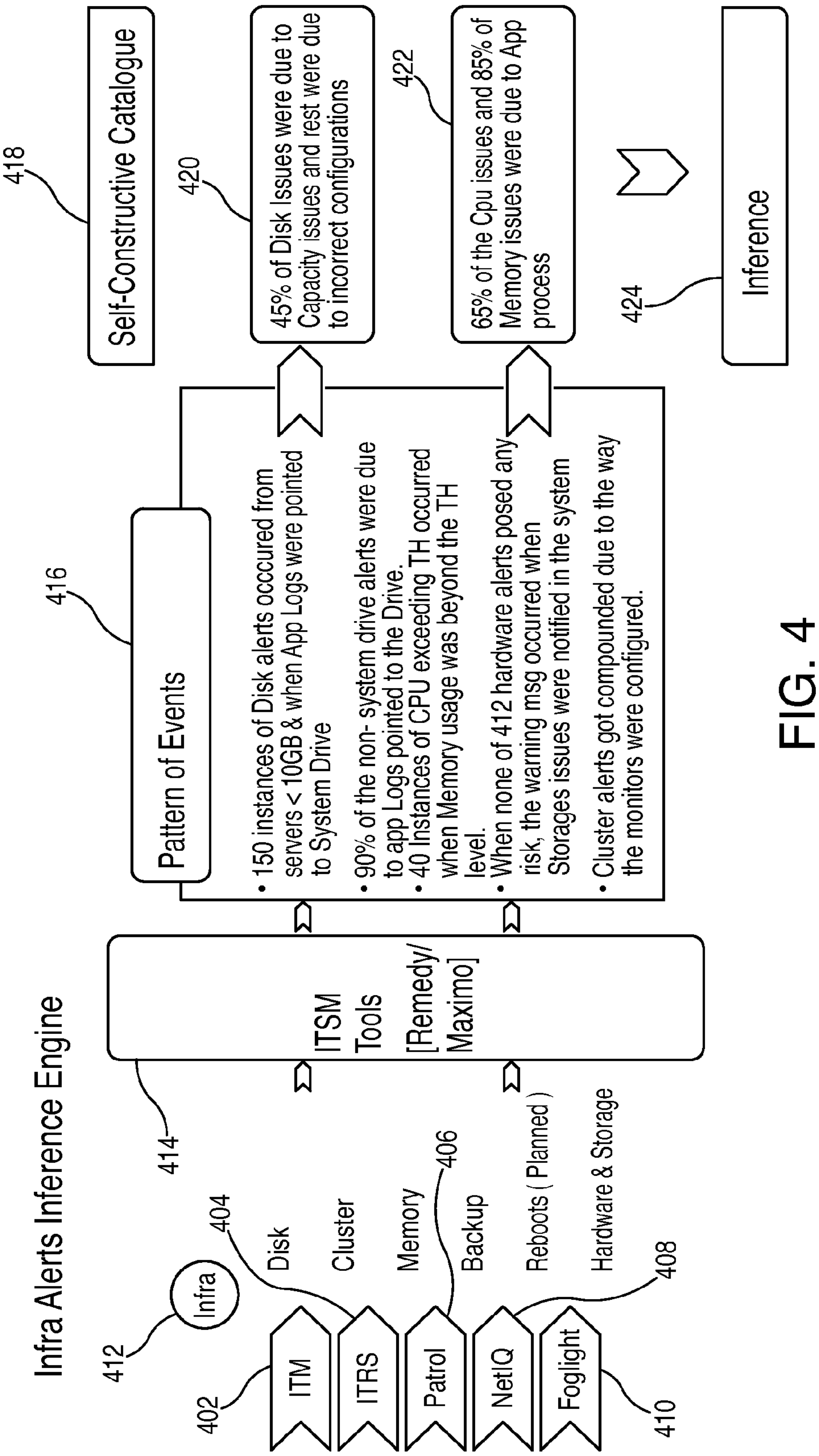
FIG. 4 shows an infra-alerts inference engine according to certain embodiments.

FIG. 4 shows an infra-alerts inference engine according to certain embodiments. ITM 402, ITRS 404, Patrol 406, NetIQ 408 and Foglight 410 all may be configured to send event information to infra 412. Infra 412 may preferably include disk infra-alerts, cluster infra-alerts, memory infra-alerts, backup reboots (planned) infra-alerts, hardware infra-alerts and storage infra-alerts. Infra 412 may preferably be configured to forward and develop the collection of various events such that a pattern of events 416 is developed.

Pattern of events 416 (in their native "pattern" language) may preferably include 150 instances of disk alerts occurred from servers <10 GB & when app logs were pointed to system drive, 90% of the non-system drive alerts were due to app logs pointed to the drive, 40 instances of CPU exceeding threshold ("TH") occurred when memory usage was beyond the TH level, when none of 412 hardware alerts posed any risk, the warning message occurred when storage issues were notified in the system and cluster alerts got compounded due to the way the monitors were configured.

Based on pattern of events 416, self-constructive catalogue 418 may be updated with the following inferences: As shown at 420, 45% of disk issues were due to capacity issues. The remainder were due to incorrect configurations, and, as shown at 422, 65% of the CPU issues and 85% of the memory issues were due to the application process.

Figure 5:
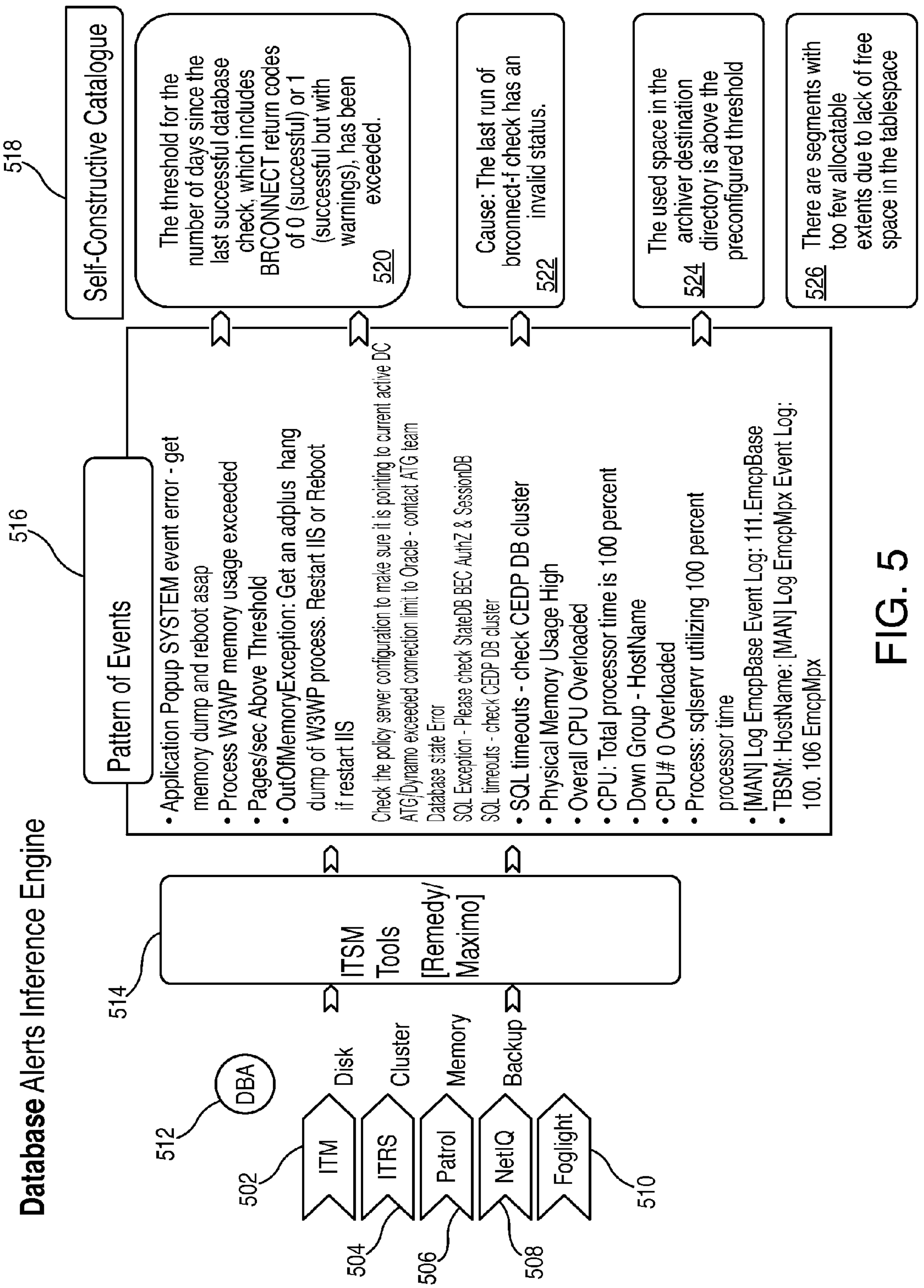
FIG. 5 shows a database alerts inference engine according to certain embodiments.

FIG. 5 shows a database alerts inference engine according to certain embodiments. ITM 402, ITRS 404, Patrol 406, NetIQ 408 and Foglight 410 all may be configured to send event information to database alerts ("DBA") 512. DBA 512 may preferably include disk alerts, cluster alerts, memory alerts and/or backup alerts. ITSM Tools 514 (which may include tools such as Remedy and/or Maximo) may be used to forward and develop the collection of various events such that pattern(s) of events 516 are developed.

Exemplary patterns of events 516 may include the following:

Application Popup SYSTEM event error—get memory dump and reboot asap

Process W3WP memory usage exceeded

Pages/sec Above Threshold

OutOfMemoryException: Get an adplus hang dump of W3WP process. Restart IIS or Reboot if restart IIS Check the policy server configuration to make sure it is pointing to current active DC ATG/Dynamo exceeded connection limit to Oracle—contact ATG team Database state Error SQL Exception—Please check StateDB BEC AuthZ & SessionDB SQL timeouts—check CEDP DB cluster Physical Memory Usage High Overall CPU Overloaded CPU: Total processor time is 100 percent Down Group—HostName CPU#0 Overloaded Process: sqlservr utilizing 100 percent processor time

[MAN] Log EmcpBase Event Log: 111.EmcpBase

TBSM: HostName: [MAN] Log EmcpMpx Event Log: 100. 106 EmcpMpx

Based on pattern(s) of events 516, self-constructive catalogue 518 may be updated with the following inferences: the threshold for the number of days since the last successful database check which includes BRCONNECT return codes of 0 (successful) or 1 (successful but with warnings), has been exceeded, as shown in 520; cause: the last run of brconnect-f check has an invalid status, as shown in 522; the used space in the archiver destination directory is above the preconfigured threshold as shown in 524; there are segments with too few allocatable extents due to lack of free space in the tablespace, as shown in 526.

Figure 6:
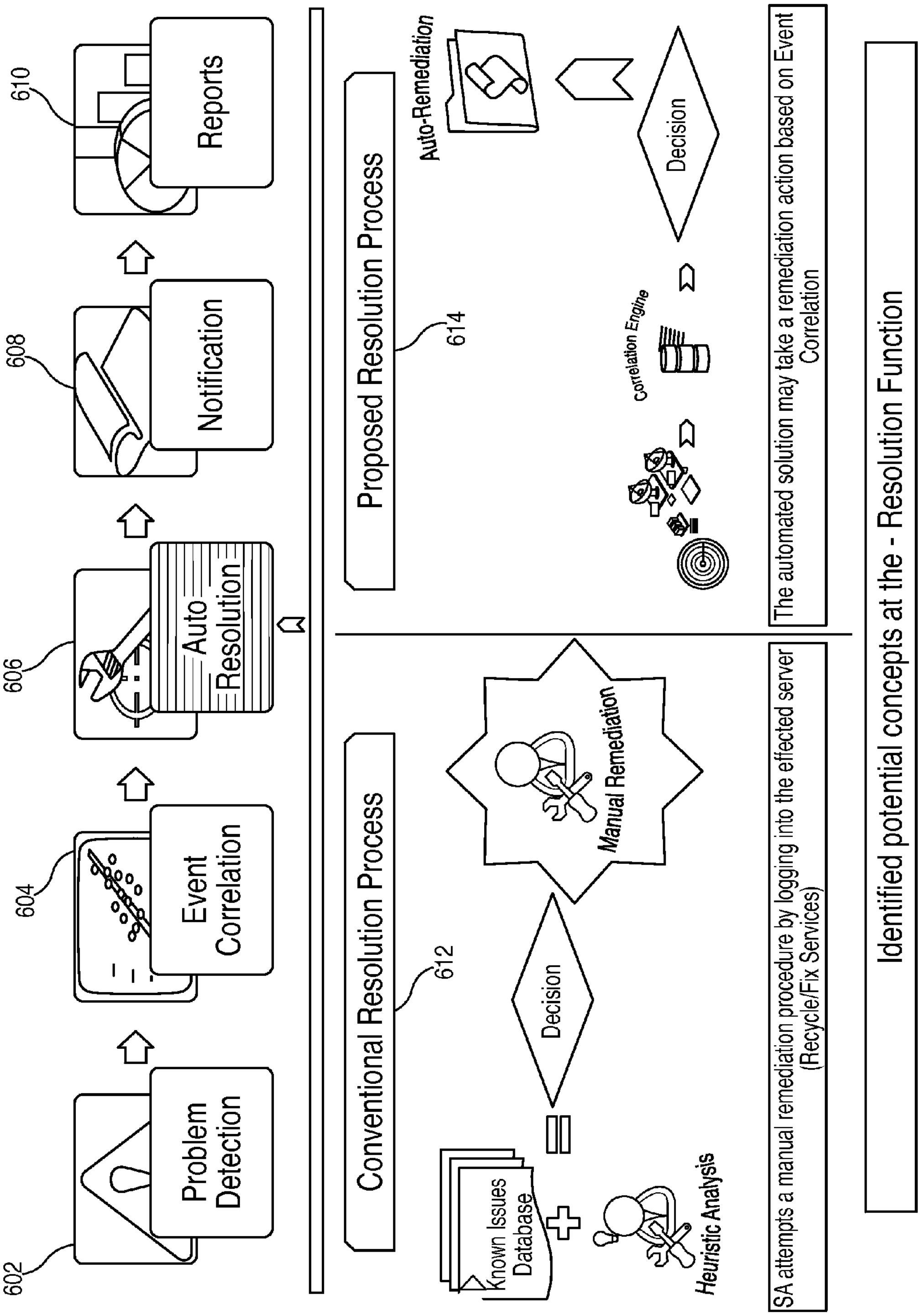
FIG. 6 shows a conventional resolution process and a resolution process according to certain embodiments.

FIG. 6 shows a high-level overview of various stages of the embodiments. It should be noted that the various stages of the embodiments may include problem detection 602, event correlation 604, auto resolution 606, notification 608 and reporting 610.

FIG. 6 also shows a conventional resolution process 612 and a proposed resolution process 614 according to certain embodiments. Conventional resolution process 612 and a proposed resolution process 614 preferably reside in auto-resolution stage 606 of certain embodiments.

Conventional resolution process 612 may include when a service associate ("SA") attempts a manual remediation procedure by logging into the affected server to perform, for example, recycle and/or fix services. Such an SA may consult with a known issues database and come to a decision in order to implement a manual remediation.

Proposed resolution process 614 may preferably provide a solution by implementing a remediation action. The remediation action may be based on event correlation to past events. In such embodiments, the identified potential concepts at resolution function may preferably be implemented.

Figure 7:
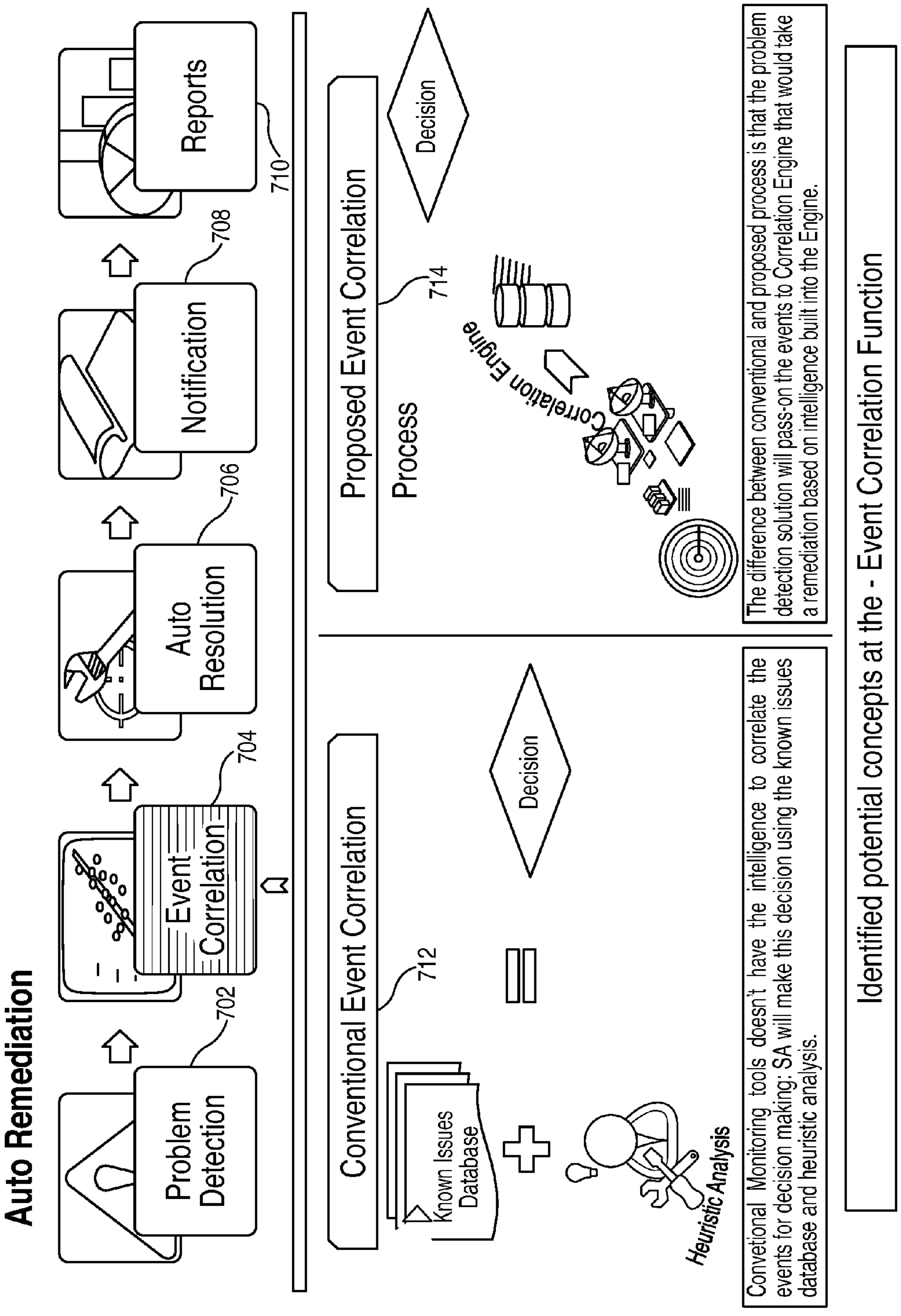
FIG. 7 shows a conventional correlative process and a correlative process according to certain embodiments.

FIG. 7 shows a conventional correlative process 712 and a correlative process according to certain embodiments 714. FIG. 7 also shows various stages of the embodiments which may include problem detection 702, event correlation 704, auto-resolution 706, notification 708 and reporting 710. It should be noted that the subject matter set forth in FIG. 7 corresponds to event correlation stage 704.

Conventional event correlation 712 may combine heuristic analysis with a known Issues Database to inform a decision regarding event correlation. Conventional monitoring does not typically include sufficient intelligence to correlate the events for decision making. Accordingly, the SA typically decisions an event using the known issues database and heuristic analysis.

Correlative process according to certain embodiments 714 may preferably provide a platform for enabling auto-resolution stage 706. One difference between conventional event correlation 712 and correlative process according to certain embodiments 714 may preferably be that the event/problem detection solution provided by correlative process according to certain embodiments 714 preferably passes on the events/problems to the correlation engine. Once the events/problems have been passed on to the correlation engine, then the correlation engine may preferably perform remediation based on historical intelligence acquired by, and built into, the engine.

FIGS. 8A and 8B show a log of events/problems 802 according to certain embodiments. Table 804 shows a tabulation 804 of events/problems 802.

Figure 9:
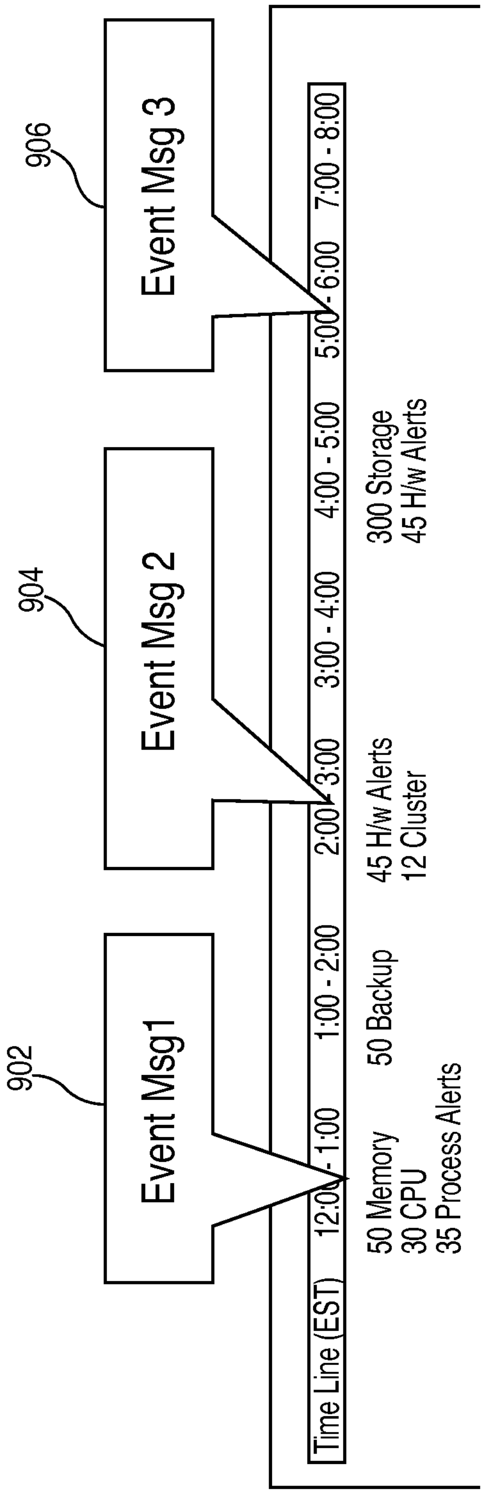
FIG. 9 shows a chronological events occurrence summary according certain embodiments.

FIG. 9 shows a chronological events occurrence summary according certain embodiments. The chronological events occurrence summary may include event msg 1 902 which shows that, between 12:00 PM and 1:00 PM, 50 memory related events occurred, 30 CPU related events occurred and 35 process-related alerts occurred. Event msg 2 904 shows that, between 2:00 PM and 3:00 PM, 45 hardware-related alerts and 12 cluster-related events occurred. Event msg 3 906 shows that, between 4:00 PM and 5:00 PM, 300 storage-related events and 45 hardware alerts occurred. FIGS. 8 and 9 show, individually and collectively, the various events/problems that may occur in multi-layer information technology ("IT") structures and that may require certain of the embodiments set forth herein.

Thus, systems and methods for detection, remediation and inference rule development for multi-layer information technology ("IT") structures have been provided. Persons skilled in the art will appreciate that the present invention can be practiced by other than the described embodiments, which are presented for purposes of illustration rather than of limitation. The present invention is limited only by the claims that follow.

What is claimed is:

1. An apparatus for detection, remediation and inference rule development for multi-layer information technology ("IT") structures, wherein layers in the multi-layer IT structure consists of a network layer, a virtual layer, an operating system layer, a middle ware ("MW") layer and a data layer, the apparatus comprising:

an event generator that monitors for, retrieves, and pools a plurality of error events and a plurality of performance events from a collection of alerting sources, said alerting sources for providing alerts from the network layer, the virtual layer, the operating system layer, the MW layer and the data layer;

an event parser that provides a system status; and an analytics engine that detects a plurality of patterns and a plurality of relationships in the retrieved error events, the patterns including an identification of a specific one of the network layer, the virtual layer, the operating system layer, the MW layer and the data layer, within which the error occurred, and an identification of performance events and system status, and an identification of model event hierarchies based on the detected patterns and relationships, wherein said detecting a plurality of patterns comprises indexing the error events into one of the memory-related issues, DSN-related issues, resource-related issues attributed to infrastructure resources and "String not found" related issues that were followed by application failure, said indexing further comprising self-constructively cataloguing the error events based on the indexing; wherein said analytics engine is configured to invoke one or more auto-remediation processes in response to pre-determined indexed error events, said one or more auto-remediation processes based, at least in part, on the detected patterns, relationships and hierarchies, and wherein said analytics engine is for detecting a threshold number of occurrences relating to a sequence of a pre-determined number of memory errors over a pre-determined period of time;

wherein the analytics engine invokes at least one auto-remediation process in response to the detection of the pre-determined number of memory errors over a pre-determined period of time, said auto-remediation process comprising at least one of restart, bounce service, kill present application and exit current routine.

2. The apparatus of claim 1 wherein the analytics engine further invokes at least one auto-remediation process in response to the detection of a pre-determined down time associated with data-source-name-related errors.

3. The apparatus of claim 2 wherein said down time is calculated as a percentage of a pre-determined period of time.

4. The apparatus of claim 1 wherein the engine is for detecting a predetermined number of resource-related events over a pre-determined amount of time and, based on the detecting a pre-determined number of resource-related events over a predetermined amount of time, the analytics engine attributes the resource-related events to infrastructure resources.

5. The apparatus of claim 1 wherein the engine detects a pre-determined number of occurrences of "string not found" over a pre-determined period and also detects an outage following every occurrence of "string not found" over the pre-determined time period.

6. The apparatus of claim 5 wherein the analytics engine is configured to infer a rule for the occurrence of the outage following the occurrence of "string not found".

7. The apparatus of claim 1 wherein the engine detects a pre-determined number of occurrences of "application round-trip time-out(s)" event alerts over a predetermined period, and that said pre-determined number of occurrences of "application round-trip time-out" event alerts correspond to a greater than threshold level of application slowness.

8. The apparatus of claim 7 wherein the greater than threshold level of application slowness inhibits a communication channel to a pre-determined application.

9. A method for detection, remediation and inference rule development for multi-layer information technology ("IT") structures, wherein layers in the multi-layer IT structure consist of a network layer, a virtual layer, an operating system layer, a middle ware ("MW") layer and a data layer, the method comprising:

monitoring, retrieving, and pooling error events and performance events from a collection of alerting sources, said alerting sources for providing alerts from the network layer, the virtual layer, the operating system layer, the MW layer and the data layer;

parsing the error events and performance events to provide a current system status; and detecting patterns and relationships in the retrieved error events, performance events and system status, the patterns including an identification of which specific one of the network layer, the virtual layer, the operating system layer, the MW layer and the data layer, the error occurred within; wherein said detecting comprises indexing the error events into one of the memory-related issues, DSN-related issues, resource-related issues attributed to infrastructure resources and "String not found" related issues that were followed by application failure, said indexing further comprising self-constructively cataloguing the error events based on the indexing;

modeling event hierarchies based on the detected patterns and relationships; and invoking at least one auto-remediation process in response to pre-determined indexed error events, said auto-remediation process based, at least in part, on the detected patterns, relationships and hierarchies, and wherein said auto-remediation process detects a predetermined number of occurrences of "string not found" over a pre-determined period and also detects an outage following every occurrence of "string not found" over the pre-determined time period;

inferring a rule for the occurrence of the outage following the occurrence of "string not found".

10. The method of claim 9 wherein the analytics engine further invokes at least one auto-remediation process in response to the detection of a pre-determined down time associated with data-source-name-related errors.

11. The method of claim 10 wherein said down time is calculated as a percentage of a pre-determined period of time.

12. The method of claim 9 wherein the engine is for detecting a predetermined number of resource-related events over a pre-determined amount of time and, based on the detecting a pre-determined number of resource-related events over a predetermined amount of time, the analytics engine attributes the resource-related events to infrastructure resources.

13. The method of claim 9 wherein the engine detects a threshold number of occurrences relating to a sequence of a pre-determined number of memory errors over a predetermined period of time.

14. The method of claim 9 wherein the engine detects a pre-determined number of occurrences of "application round-trip time-out(s)" event alerts over a predetermined period, and that said pre-determined number of occurrences of "application round-trip time-out" event alerts correspond to a greater than threshold level of application slowness.

15. The method of claim 9 wherein the greater than threshold level of application slowness inhibits a communication channel to a pre-determined application.

16. An apparatus for detection, remediation and inference rule development for multi-layer information technology ("IT") structures, wherein layers in the multi-layer IT structure comprise a network layer, a virtual layer, an operating system layer, a middle ware ("MW") layer and a data layer, the apparatus comprising:

an event generator that monitors for, retrieves, and pools error events and performance events from a collection of alerting sources, said alerting sources for providing alerts from the network layer, the virtual layer, the operating system layer, the MW layer and the data layer;

an event parser that provides a system status; and an analytics engine that detects patterns and relationships in the retrieved error events, performance events and system status, and models event hierarchies based on the detected patterns and relationships, the patterns including an identification of a specific one of the network layer, the virtual layer, the operating system layer, the MW layer and the data layer, within which the error occurred;

wherein said analytics engine is configured to invoke auto-remediation processes in response to pre-determined indexed error events, said auto-remediation processes based, at least in part on the detected patterns, relationships and hierarchies, and wherein said engine is for detecting a pre-determined number of resource related events over a pre-determined amount of time and, based on the detecting a pre-determined number of resource-related events over a pre-determined amount of time, the analytics engine attributes the resource-related events to infrastructure resources.

17. The apparatus of claim 16 wherein the analytics engine further invokes at least one auto-remediation process in response to the detection of a pre-determined down time associated with data-source-name-related errors.

18. The apparatus of claim 17 wherein said down time is calculated as a percentage of a pre-determined period of time.

19. The apparatus of claim 16 wherein the engine detects a pre-determined number of occurrences of "string not found" over a pre-determined period and also detects an outage following every occurrence of "string not found" over the pre-determined time period.

20. The apparatus of claim 19 wherein the analytics engine is configured to infer a rule for the occurrence of the outage following the occurrence of "string not found".

21. The apparatus of claim 16 wherein the engine detects a pre-determined number of occurrences of "application round-trip time-out(s)" event alerts over a predetermined period, and that said pre-determined number of occurrences of "application round-trip time-out" event alerts correspond to a greater than threshold level of application slowness.

22. The apparatus of claim 21 wherein the greater than threshold level of application slowness inhibits a communication channel to a pre-determined application.

23. The apparatus of claim 16 wherein said engine is for detecting a threshold number of occurrences relating to a sequence of a pre-determined number of memory errors over a pre-determined period of time; and wherein the analytics engine invokes at least one auto-remediation process in response to the detection of the pre-determined number of memory errors over a predetermined period of time, said auto-remediation process comprising at least one of restart, bounce service, kill present application and exit current routine.

* * * * *